(12) United States Patent
Noguchi

(10) Patent No.: US 9,267,568 B2
(45) Date of Patent: Feb. 23, 2016

(54) SHOCK ABSORBER

(71) Applicant: KAYABA INDUSTRY CO., LTD., Tokyo (JP)

(72) Inventor: Nobuhiro Noguchi, Toyohashi (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 14/061,140

(22) Filed: Oct. 23, 2013

(65) Prior Publication Data

US 2014/0116828 A1 May 1, 2014

(30) Foreign Application Priority Data

Oct. 26, 2012 (JP) ................................. 2012-236182

(51) Int. Cl.
| | |
|---|---|
| *F16F 9/00* | (2006.01) |
| *F16F 9/44* | (2006.01) |
| *F16F 9/18* | (2006.01) |
| *F16F 9/34* | (2006.01) |
| *F16F 9/32* | (2006.01) |
| *F16F 7/09* | (2006.01) |

(52) U.S. Cl.
CPC ................. *F16F 9/446* (2013.01); *F16F 9/185* (2013.01); *F16F 7/09* (2013.01); *F16F 9/3242* (2013.01); *F16F 9/34* (2013.01)

(58) Field of Classification Search
CPC ............. F16F 7/00; F16F 7/09; F16F 7/1034; F16F 9/00; F16F 9/062; F16F 9/10; F16F 9/14; F16F 9/3207; F16F 9/3214; F16F 9/3221; F16F 9/3242; F16F 9/34; F16F 9/446; F16F 9/185
USPC ................. 188/297, 313, 314, 315, 316, 317, 188/322.13, 322.15
See application file for complete search history.

(56) References Cited

U.S. PATENT DOCUMENTS

| | | | |
|---|---|---|---|
| 2006/0131118 A1* | 6/2006 | Huang ........................... | 188/313 |
| 2009/0001637 A1* | 1/2009 | Murakami ..................... | 267/118 |
| 2012/0049427 A1* | 3/2012 | Hsu .............................. | 267/217 |
| 2012/0247893 A1* | 10/2012 | Gonzalez et al. ............. | 188/313 |

FOREIGN PATENT DOCUMENTS

JP 2007-225066 A 9/2007

* cited by examiner

*Primary Examiner* — Melody Burch
(74) *Attorney, Agent, or Firm* — Rabin & Berdo, P.C.

(57) ABSTRACT

At least one of fluid paths of a shock absorber is a bypass path including: a one-side opening opened to a chamber in one side; the other-side opening opened to a chamber in the other side; a one-side shaft member fluid path that is connected to the one-side opening and passes through an inner side of the shaft member; the other-side shaft member fluid path that is connected to the other-side opening and passes through the inner side of the shaft member; and a support member fluid path formed inside the support member to connect the one-side shaft member fluid path and the other-side shaft member fluid path. The valves provided in the bypass path are housed in the support member.

5 Claims, 8 Drawing Sheets

SHOCK ABSORBER

TECHNICAL FIELD

The present invention relates to a shock absorber.

BACKGROUND ART

A shock absorber attenuates vibration applied to a vehicle, an apparatus, a structure, and the like. JP 2007-225066A discloses a shock absorber D3 for a front fork that suspends a front wheel in a saddled vehicle such as a two-wheeled or three-wheeled vehicle as illustrated in FIG. 8.

The shock absorber D3 has a shock absorber main body T including an outer tube T1 connected to a chassis side and an inner tube T2 connected to a wheel side. The shock absorber D3 contracts or expands as the inner tube T2 is inserted into or retracted from the outer tube T1.

The shock absorber D3 includes: a cap member (support member) 7 that stops a chassis-side opening of the shock absorber main body T; a piston rod (shaft member) 2 supported by the cap member 7 and retractably inserted into the inner tube T2; an annular piston (partitioning wall) 3 held in the outer circumference of the leading end of the piston rod 2 to make sliding contact with an inner circumferential surface of the inner tube T2; and an expansion-side chamber (chamber in one side) L1 and a compression-side chamber (chamber in the other side) L2 that are partitioned by the piston 3 and contain a working fluid.

The expansion-side chamber L1 communicates with the compression-side chamber L2 through three fluid paths, including an expansion-side piston fluid path (not illustrated) formed in the piston (partitioning wall) 3, a compression-side piston fluid path 31 formed in the piston (partitioning wall) 3, and a bypass path B7 formed in the piston rod (shaft member) 2. Each fluid path is provided with each valve (such as an expansion-side damping valve V13, a compression-side damping valve V14, and an orifice valve V15).

The expansion-side piston fluid path (not illustrated) is provided with the expansion-side damping valve V13. The expansion-side damping valve V13 only allows the working fluid to pass through the expansion-side piston fluid path and move from the expansion-side chamber L1 to the compression-side chamber L2 and exerts predetermined resistance to the working fluid passing through the expansion-side piston fluid path.

The compression-side piston fluid path 31 is provided with the compression-side damping valve V14. The compression-side damping valve V14 only allows the working fluid to pass through the compression-side piston fluid path 31 and move from the compression-side chamber L2 to the expansion-side chamber L1 and exerts predetermined resistance to the working fluid passing through the compression-side piston fluid path 31. In addition, the compression-side damping valve V14 includes: a valve body V14a having a ring plate shape whose outer circumference seats on a seat surface formed in the expansion-side chamber side (upper side in FIG. 8) of the piston 3; a bias spring V14b that biases the valve body V14a toward a closing direction (piston side); and an adjuster V14c that adjusts an elastic force of the bias spring V14b.

The bypass path B7 formed in the piston rod 2 is provided with an orifice valve V15. The orifice valve V15 includes a needle-like valve body V15a that forms an orifice by inserting a leading end thereof into the bypass path B7 to narrow the bypass path B7 and an adjuster V15b that changes a fluid path area of the bypass path B7 by driving the valve body 15a.

When a piston velocity is in a low velocity range during contraction or expansion of the shock absorber D3, a working fluid in one of the expansion-side chamber L1 and the compression-side chamber L2 compressed by the piston 3 passes through the orifice formed by the orifice valve V15 and the bypass path B7 and moves to the other one of the expansion-side chamber L1 and the compression-side chamber L2. As a result, the shock absorber D3 generates a damping force caused by the resistance of the orifice valve V15. This damping force can be adjusted by the adjuster V15b of the orifice valve V15.

When the piston velocity is in a middle or high velocity range during expansion of the shock absorber D3, the working fluid of the expansion-side chamber L1 compressed by the piston 3 opens the expansion-side damping valve V13 and moves to the compression-side chamber L2 through the expansion-side piston fluid path (not illustrated). As a result, the shock absorber D3 generates an expansion-side damping force caused by the resistance of the expansion-side damping valve V13.

When the piston velocity is in a middle or high velocity range during contraction of the shock absorber D3, the working fluid of the compression-side chamber L2 compressed by the piston 3 opens the compression-side damping valve V14 and moves to the expansion-side chamber L1 through the compression-side piston fluid path 31. As a result, the shock absorber D3 generates a compression-side damping force caused by the resistance of the compression-side damping valve V14. This compression-side damping force can be adjusted by the adjuster V14c of the compression-side damping valve V14.

SUMMARY OF INVENTION

In the aforementioned shock absorber D3 of the related art, the piston rod (shaft member) 2 is formed in a cylindrical shape, and a cylindrical push rod 24 is inserted into the inside of the piston rod 2. The push rod 24 is movable along a shaft center line of the shock absorber D3 and rotatable with respect to the shaft center line of the shock absorber D3.

A leading end (lower end in FIG. 8) of the push rod 24 abuts on a spring sheet 25 that supports the upper end of the bias spring V14b, and the spring sheet 25 is interposed between the bias spring V14b and the push rod 24. The adjuster V14c of the compression-side damping valve V14 can move the push rod 24 along the axial direction. As the push rod 24 is moved along the axial direction by controlling the adjuster V14c of the compression-side damping valve V14, a compressive force of the bias spring V14b is changed to alter a valve opening pressure of the compression-side damping valve V14. As a result, the compression-side damping force of the shock absorber D3 in the case of a middle or high piston velocity range is adjusted.

An engagement portion 26 extending to the base end side of the valve body V15a is retractably inserted into the inside of the leading end (lower end in FIG. 8) of the push rod 24. The inner circumference of the push rod 24 and the outer circumference of the engagement portion 26 are formed to have a non-circular cross section. As a result, the push rod 24 and the valve body V15a can rotate in synchronization. The valve body V15a of the orifice valve V15 is screwed to the inner circumference of the piston rod (shaft member) 2 so that the adjuster V15b can rotate the push rod 24. As the push rod 24 is rotated by controlling the adjuster V15b of the orifice valve V15, the valve body V15a is driven in the axial direction so that the fluid path area of the bypass path B7 changes. As a result, a damping force of the shock absorber D3 in the case of a low piston velocity range is adjusted.

That is, in order to perform two types of damping force adjustment for the expansion-side and compression-side damping forces in the case of a low piston velocity range and the compression-side damping force in the case of a middle or high piston velocity range, the push rod 24 is shared by the compression-side damping valve V14 and the orifice valve V15. The compression-side damping valve V14 is adjusted using a rectilinear motion of the push rod 24, and the orifice valve V15 is adjusted using a rotational motion of the push rod 24.

Therefore, it is necessary that the rotational motion of the push rod 24 be changed to the rectilinear motion of the valve body V15a of the orifice valve V15, the push rod 24 and the valve body V15a be rotated in synchronization, or the push rod 24 and the valve body V15a be relatively moved along the axial direction. For this reason, a structure of the shock absorber D3 becomes complicated.

It is therefore an object of the present invention to provide a shock absorber capable of performing a plurality of types of damping force adjustment and preventing a complicated structure.

According to one aspect of the present invention, a shock absorber comprises a chamber in one side and a chamber in the other side that contain an working fluid; a shaft member inserted from the chamber in one side through the chamber in the other side; an annular partitioning wall held in an outer circumference of the shaft member to partition the chamber in one side and the chamber in the other side; a support member connected to a base end of the shaft member to support the shaft member; one or more fluid paths that causes the chamber in one side and the chamber in the other side to communicate with each other; and one or more valves provided in each fluid path, wherein at least one of the fluid paths is a bypass path having a one-side opening formed in a portion where the shaft member is arranged inside the chamber in one side and opened to the chamber in one side, an other-side opening formed in a portion where the shaft member is arranged inside the chamber in the other side and opened to the chamber in the other side, a one-side shaft member fluid path that is connected to the one-side opening and passes through an inner side of the shaft member, the other-side shaft member fluid path that is connected to the other-side opening and passes through the inner side of the shaft member, and a support member fluid path formed inside the support member to connect the one-side shaft member fluid path and the other-side shaft member fluid path, and the valves provided in the bypass path are housed in the support member.

DESCRIPTION OF EMBODIMENTS

Figure 1:
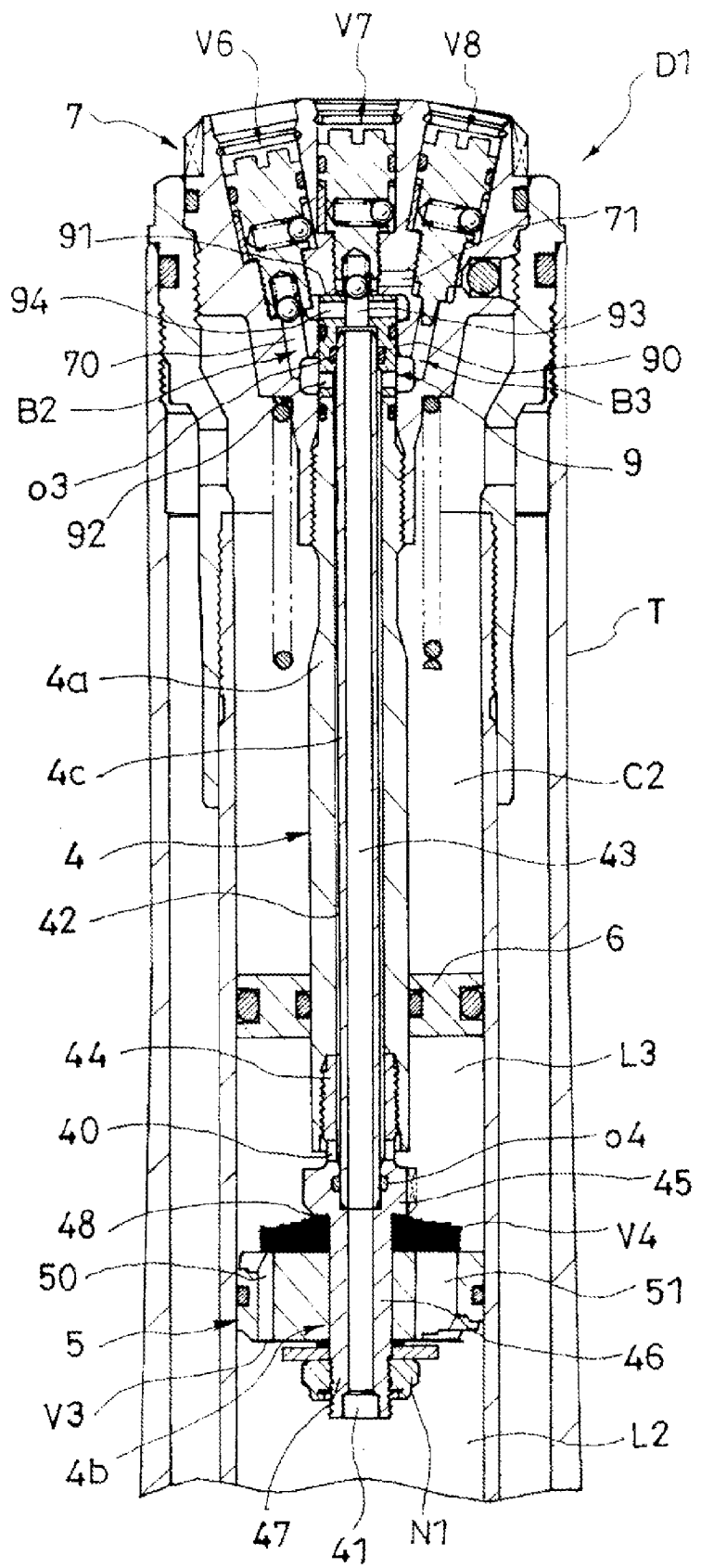
FIG. 1 is a cross-sectional view illustrating main parts of a shock absorber according to a first embodiment of the present invention.

Hereinafter, embodiments of the present invention will be described with reference to the accompanying drawings. Throughout the drawings, like reference numerals denote like elements.

A first embodiment will be described.

Figure 2:
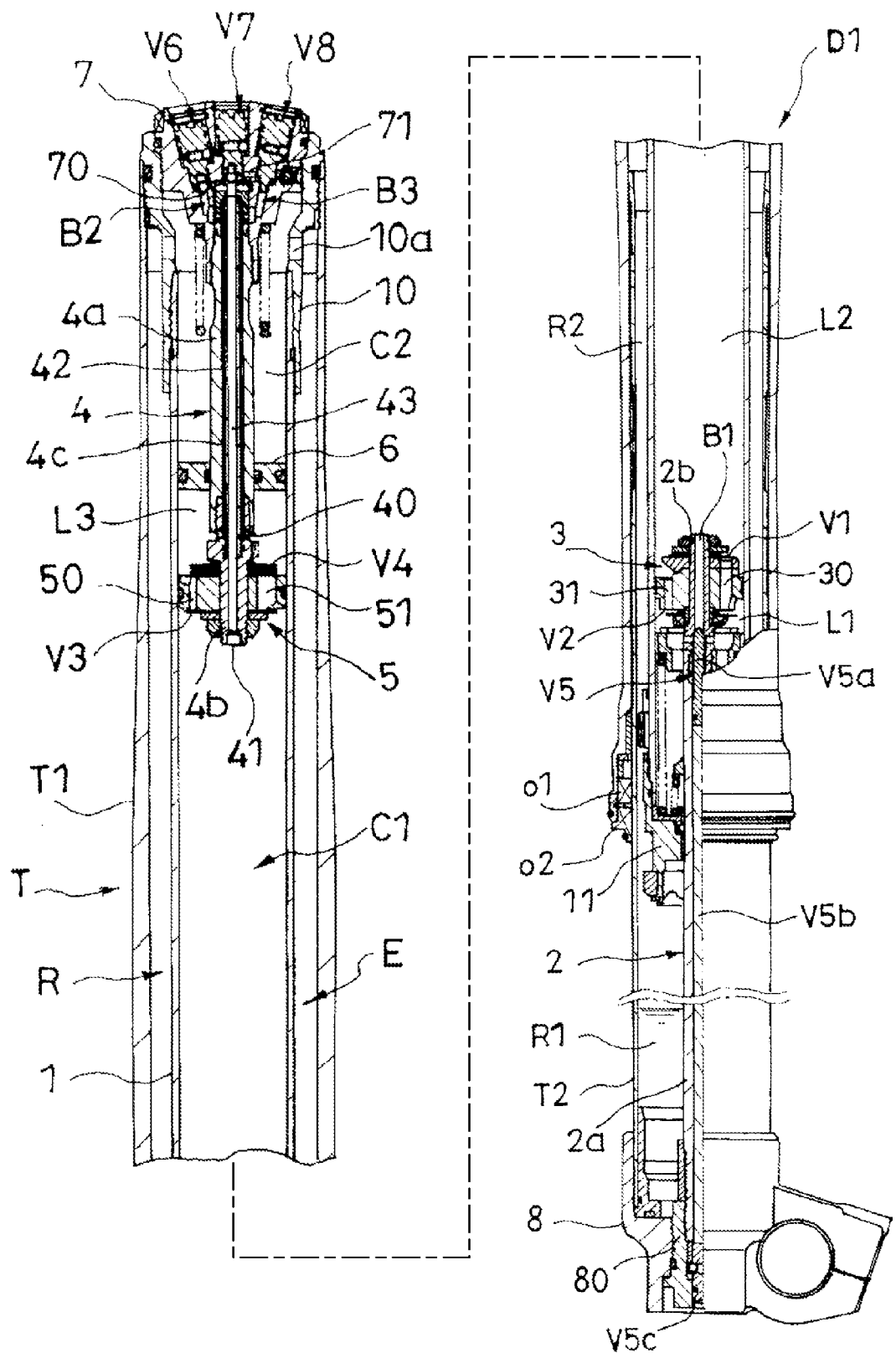
FIG. 2 is a partially cut-away front view illustrating the shock absorber according to the first embodiment of the present invention.
Figure 3A:
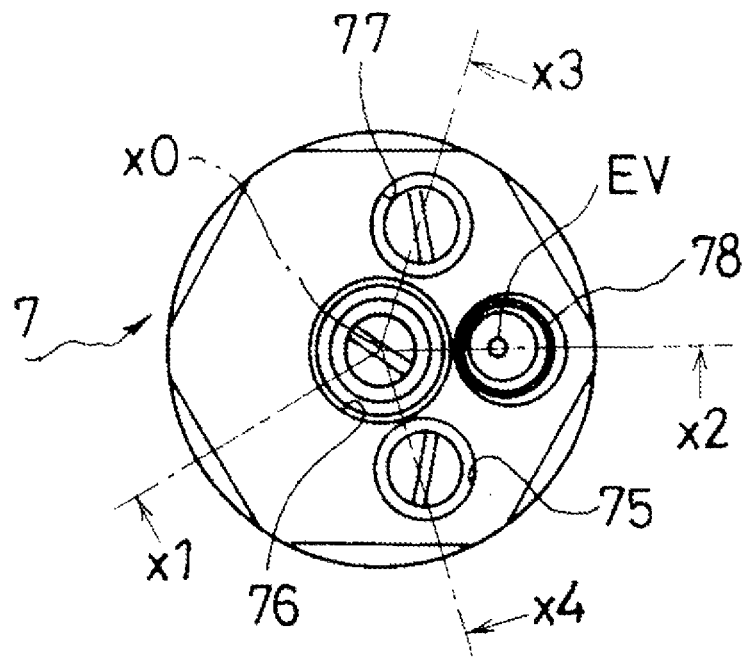
FIG. 3A is a plan view illustrating a cap member.
Figure 3B:
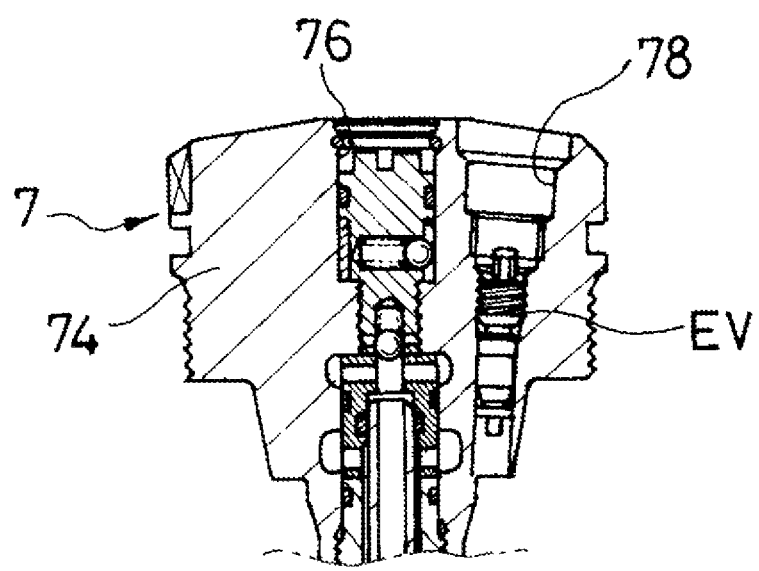
FIG. 3B is a cross-sectional view taken along a line x1-x0-x2 of FIG. 3A.
Figure 4:
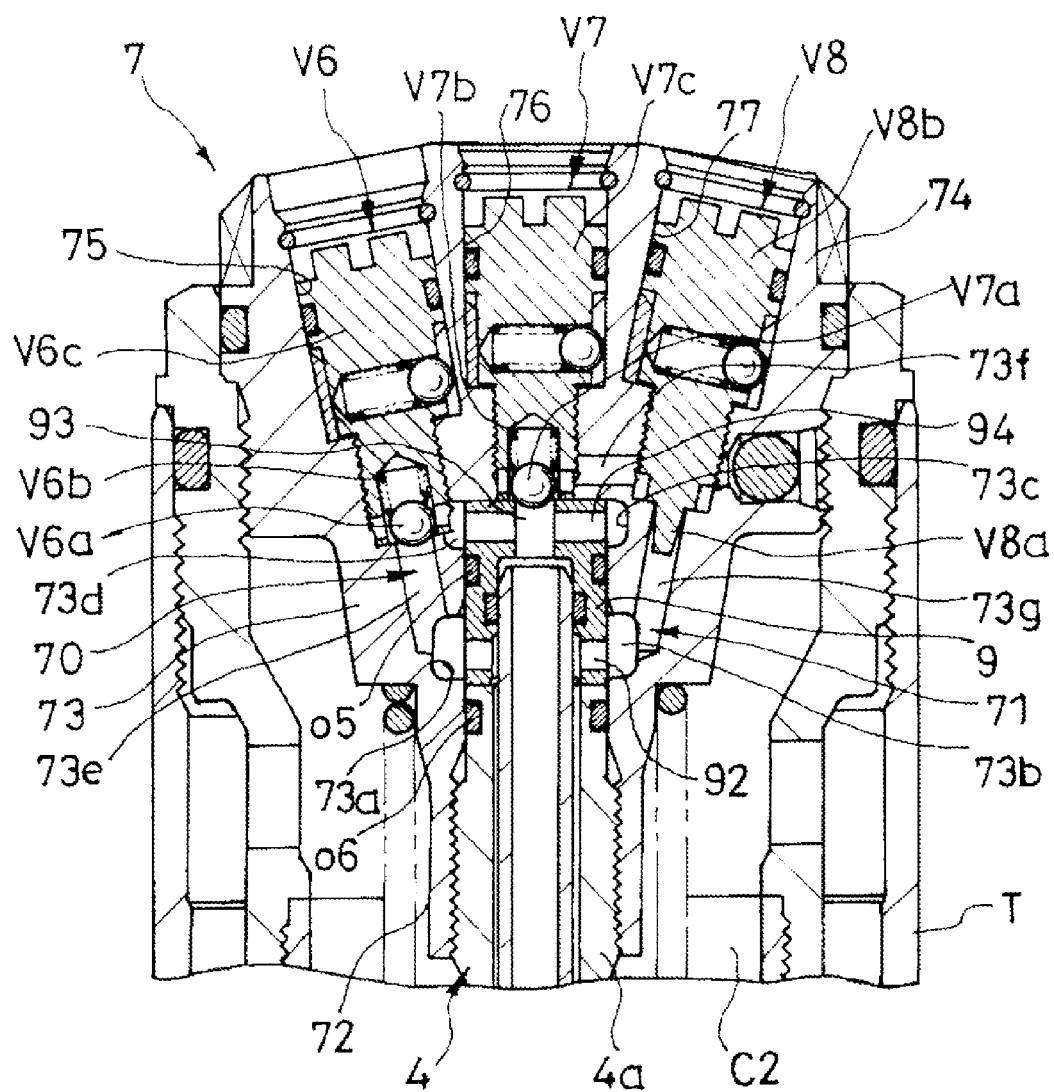
FIG. 4 is a partially enlarged view illustrating a part of FIG. 1.

FIG. 1 is a cross-sectional view illustrating main parts of the shock absorber according to the present embodiment. The cross section of the cap member of FIG. 1 is taken along a line x3-x0-x4 of FIG. 3A. FIG. 2 is a partially cut-away front view illustrating the shock absorber according to the first embodiment. FIG. 3A is a plan view illustrating the cap member. FIG. 3B is a cross-sectional view taken along a line x1-x0-x2 of FIG. 3A. FIG. 4 is a partially enlarged view illustrating a part of FIG. 1.

Referring to FIG. 1, the shock absorber D1 includes: a liquid receiving chamber (chamber in one side) L3 and a compression-side chamber (chamber in the other side) L2 that contain a working fluid; a base rod (shaft member) 4 inserted from the liquid receiving chamber L3 through the compression-side chamber L2; an annular base member (partitioning wall) 5 held in the outer circumference of the base rod 4 to partition the liquid receiving chamber L3 and the compression-side chamber L2; a cap member (support member) 7 connected to a base end (upper end portion of FIG. 1) of the base rod 4 to support the base rod 4; four fluid paths, including an expansion-side base member fluid path 50, a compression-side base member fluid path 51, a second bypass path B2, and a third bypass path B3, that connect the liquid receiving chamber L3 and the compression-side chamber L2; and one or more valves provided in each of the fluid paths, including an expansion-side check valve V3, a compression-side damping valve V4, a second expansion-side damping valve V6, a second compression-side check valve V7, and a second orifice valve V8.

The second bypass path (bypass path) B2 includes: a one-side opening 40 formed in a portion where the base rod (shaft member) 4 is arranged inside the liquid receiving chamber (chamber in one side) and opened to the liquid receiving chamber L3; the other-side opening 41 formed in a portion where the base rod 4 is arranged in the compression-side chamber (chamber in the other side) L2 and opened to the compression-side chamber L2; a one-side shaft member fluid path 42 that is connected to the one-side opening 40 and passes through the inside of the base rod 4; the other-side shaft member fluid path 43 that is connected to the other-side opening 41 and passes through the inside of the base rod 4; and a first support member fluid path (support member fluid path) 70 formed inside the cap member (support member) 7 to connect the one-side shaft member fluid path 42 and the other-side shaft member fluid path 43.

The third bypass path (bypass path) B3 includes: the one-side opening 40 formed in a portion where the base rod (shaft member) 4 is arranged inside the liquid receiving chamber (chamber in one side) L3 and opened to the liquid receiving chamber L3; the other-side opening 41 formed in a portion where the base rod 4 is arranged in the compression-side chamber (chamber in the other side) L2 and opened to the compression-side chamber L2; the one-side shaft member fluid path 42 that is connected to the one-side opening 40 and passes through the inside of the base rod 4; the other-side shaft member fluid path 43 that is connected to the other-side opening 41 and passes through the base rod 4; and a second support member fluid path (support member fluid path) 71 formed inside the cap member (support member) 7 to connect the one-side shaft member fluid path 42 and the other-side shaft member fluid path 43.

The cap member (support member) 7 houses the second expansion-side damping valve (valve) V6 provided in the second bypass path B2, and the second compression-side check valve (valve) V7 and the second orifice valve (valve) V8 provided in the third bypass path B3.

The shock absorber D1 is a shock absorber for a front fork that suspends a front wheel in a saddled vehicle such as a two-wheeled or three-wheeled vehicle. The front fork (not illustrated) supports the front wheel by the shock absorbers arranged in both sides of the axial direction of the front wheel. In addition, a configuration of each shock absorber mounted on the front fork may be either identical or different. At least one of the shock absorbers may be the shock absorber D1 of the present embodiment.

As illustrated in FIG. 2, the shock absorber D1 has a shock absorber main body T including an outer tube T1 connected to the chassis side and an inner tube T2 connected to the wheel side and retractably inserted into the inside of the outer tube T1. The shock absorber D1 includes: a cap member 7 installed in the outer tube T1 to stop the chassis-side opening (upper side in FIG. 2) of the shock absorber main body T; a bottom member 8 installed in the inner tube T2 to stop the wheel-side opening (lower side in FIG. 2) of the shock absorber main body T; and an annular oil seal o1 and an annular dust seal o2 installed in the inner circumference of the wheel-side end (lower side in FIG. 2) of the outer tube T1 to make sliding contact with the outer circumferential surface of the inner tube T2. As a result, the inside of the shock absorber main body T is sealed from the external air, and it is possible to prevent a liquid or gas contained in the shock absorber main body T from flowing to the external side.

The shock absorber D1 contracts or expands as the inner tube T2 is inserted into or retracted from the outer tube T1. The shock absorber D1 include: a cylinder 1 erected in the shaft center portion of the shock absorber main body T; a piston rod 2 inserted into or retracted from the cylinder 1 in synchronization with contraction or expansion of the shock absorber D1; a piston 3 that is held in the leading end of the piston rod 2 and makes sliding contact with the inner circumferential surface of the cylinder 1; a base rod 4 erected in the shaft center portion in the piston rod opposite side (upper side of FIG. 2) of the cylinder 1; a base member 5 held in the leading end of the base rod 4; and a free piston 6 making sliding contact with the inner circumferential surface of the cylinder 1 and the outer circumferential surface of the base rod 4.

The cylinder 1 is held in the cap member 7 through a cylindrical case portion 10, and the opening in the cap member opposite side (lower side in FIG. 2) is blocked by an annular rod guide 11. The inside of the cylinder 1 is partitioned by the free piston 6 into an cylinder liquid chamber C1 and an cylinder gas chamber C2 in the cap member side (upper side in FIG. 2) of the cylinder 1. The cylinder liquid chamber C1 contains a working fluid made of a liquid such as oil, water, and a water solution. The cylinder gas chamber C2 contains a gas. In the present embodiment, the shock absorber D1 is a hydraulic shock absorber in which a liquid is used as the working fluid. However, it may be possible to employ a pneumatic shock absorber in which a gas is used as the working fluid.

A reservoir R is defined between the cylinder 1 and the shock absorber main body T. In the reservoir R, there are formed a reservoir liquid chamber R1 that contains the working fluid and a reservoir gas chamber R2 that is arranged over the liquid level of the reservoir liquid chamber R1 and contains a gas. The reservoir gas chamber R2 communicates with the cylinder gas chamber C2 through a port 10a formed in the case portion 10 and constitutes an air chamber E together with the cylinder gas chamber C2. A compressed gas is hermetically encapsulated inside the air chamber E, which serves as a suspension spring (air spring). The air chamber E biases the shock absorber D1 to an expansion direction at all times to elastically support the chassis. A reactive force of the suspension spring (air spring) can be adjusted using an air valve EV (FIGS. 3A and 3B) installed in the cap member 7.

Referring to FIG. 2, the cylinder liquid chamber C1 formed inside the cylinder 1 is partitioned by the piston 3 and the base member 5 in the axial direction. The cylinder liquid chamber C1 includes: an expansion-side chamber L1 formed between the rod guide 11 and the piston 3; a compression-side chamber L2 formed between the piston 3 and the base member 5; and a liquid receiving chamber formed between the base member 5 and the free piston 6.

The piston 3 that partitions the expansion-side chamber L1 and the compression-side chamber L2 is formed in an annular shape and is held in the outer circumference of the piston rod 2. The piston 3 includes a compression-side piston fluid path 31 and an expansion-side piston fluid path 30 for causing the expansion-side chamber L1 and the compression-side chamber L2 to communicate with each other.

The expansion-side piston fluid path 30 is provided with an expansion-side damping valve V1. The expansion-side damping valve V1 only allows the working fluid to pass through the expansion-side piston fluid path 30 and move from the expansion-side chamber L1 to the compression-side chamber L2 and exerts resistance to the working fluid passing through the expansion-side piston fluid path 30. Meanwhile, the compression-side piston fluid path 31 is provided with a compression-side check valve V2. The compression-side check valve V2 only allows the working fluid to pass through the compression-side piston fluid path 31 and move from the compression-side chamber L2 to the expansion-side chamber L1 and exerts resistance to the working fluid passing through the compression-side piston fluid path 31. The resistance applied by the expansion-side damping valve V1 to the working fluid passing through the expansion-side piston fluid path 30 is set to be higher than the resistance applied by the compression-side check valve V2 to the working fluid passing through the compression-side piston fluid path 31.

The piston rod 2 that holds the piston 3 includes: a cylindrical rod main body 2a having a base end (lower end in FIG. 2) connected to the bottom member 8 through the holding member 80; and a center rod 2b screwed to the inner circumference of the leading end (upper end in FIG. 2) of the rod main body 2a with the piston 3 being installed in the outer circumference thereof. Since the rod main body 2a passes through the rod guide 11 and is supported by the rod guide 11 movably along the axial direction, the piston rod 2 can be smoothly inserted into or retracted from the cylinder 1. In the center rod 2b, a first bypass path B1 is formed to cause the expansion-side chamber L1 and the compression-side chamber L2 to communicate with each other.

The first bypass path B1 is provided with a first orifice valve V5. The first orifice valve V5 includes: a needle-like valve body V5a having a leading end inserted into the inside of the first bypass path B1 to form an orifice by narrowing the fluid path area of the first bypass path B1; a push rod V5b inserted into the inside of the rod main body 2a to abut on the back face of the valve body V5a; and an adjuster V5c installed in the holding member 80 to drive the valve body V5a using the push rod V5b. The fluid path area of the first bypass path B1 can be adjusted by controlling the adjuster V5c.

That is, the expansion-side chamber L1 and the compression-side chamber L2 communicate with each other through three paths, including the expansion-side piston fluid path 30, the compression-side piston fluid path 31, and the first bypass path B1. Each fluid path is provided with the expansion-side damping valve V1, the compression-side check valve V2, and the first orifice valve V5 for controlling a flow of the working fluid passing through each fluid path. In addition, the types and the configurations of the valves provided in each fluid path are not limited to those described above, but may be appropriately selected.

The base member 5 that partitions the liquid receiving chamber L3 and the compression-side chamber L2 is formed in an annular shape and is held in the outer circumference of the base rod 4. In the base member 5, there are formed an expansion-side base member fluid path 50 and a compression-side base member fluid path 51 for causing the liquid receiving chamber L3 and the compression-side chamber L2 to communicate with each other.

The expansion-side base member fluid path 50 is provided with the expansion-side check valve V3. The expansion-side check valve V3 only allows the working fluid to pass through the expansion-side base member fluid path 50 and move from the liquid receiving chamber L3 to the compression-side chamber L2 and exerts resistance to the working fluid passing through the expansion-side base member fluid path 50. Meanwhile, the compression-side base member fluid path 51 is provided with the compression-side damping valve V4. The compression-side damping valve V4 only allows the working fluid to pass through the compression-side base member fluid path 51 and move from the compression-side chamber L2 to the liquid receiving chamber L3 and exerts resistance to the working fluid passing through the compression-side base member fluid path 51. The resistance applied by the expansion-side check valve V3 to the working fluid passing through the expansion-side base member fluid path 50 is set to be higher than the resistance applied by the compression-side damping valve V4 to the working fluid passing through the compression-side base member fluid path 51.

The base rod 4 that holds the base member 5 has a dual tube structure including a cylindrical outer tube 4a having a base end (upper end in FIG. 2) screwed to the cap member 7, an annular center rod 4b screwed to the inner circumference of the leading end (lower end in FIG. 2) of the outer tube 4a, and a cylindrical inner tube 4c that is inserted from the outer tube 4a through the center rod 4b and has a base end (upper end in FIG. 2) protruding from the outer tube 4a.

As illustrated in FIG. 1, a one-side shaft member fluid path 42 having a tubular shape is formed between the outer tube 4a and the inner tube 4c, and the other-side shaft member fluid path 43 is formed inside the inner tube 4c. The base end (upper end in FIG. 1) of the inner tube 4c protruding from the outer tube 4a to the upper side of FIG. 1 is covered by the rod cap 9 formed in a topped cylindrical shape. An annular seal o3 is installed between the base end of the inner tube 4c and the rod cap 9, and an annular seal o4 is installed between the leading end (lower end in FIG. 1) of the inner tube 4c and the center rod 4b. The seal o3 in the base end side of the inner tube 4c blocks the opening of the one-side shaft member fluid path 42 in the cap member side (upper side in FIG. 1), and the seal o4 in the leading end side of the inner tube 4c blocks the opening of the one-side shaft member fluid path 42 in the base member side (lower end in FIG. 1). Each of the seals o3 and o4 prevents the one-side shaft member fluid path 42 and the other-side shaft member fluid path 43 from directly communicating with each other.

The center rod 4b includes: a connecting portion 44 screwed to the inner circumference of the leading end (lower end in FIG. 1) of the outer tube 4a; a large outer diameter portion 45 coaxially extending to the outer tube opposite side (lower side in FIG. 1) of the connecting portion 44; a mount portion 46 coaxially connected to the outer tube opposite side of the large outer diameter portion 45; and a screw portion 47 that is coaxially connected to the outer tube opposite side of the mount portion 46 and has a threaded outer circumference. The outer diameter of the large outer diameter portion 45 is formed to be larger than the outer diameter of the mount portion 46, and an annular stepped surface 48 is formed in the boundary between the large outer diameter portion 45 and the mount portion 46. As the mount portion 46 is inserted into the shaft center of the base member 5 formed in an annular shape, and a nut N1 is screwed to the screw portion 47, the base member 5 can be interposed between the nut N1 and the stepped surface 48, and the base member 5 can be held in the outer circumference of the base rod 4.

The connecting portion 44 and the large outer diameter portion 45 are arranged in the liquid receiving chamber L3, and the screw portion 47 is arranged in the compression-side chamber L2. In a boundary between the connecting portion 44 and the large outer diameter portion 45, there is formed a one-side opening 40 for causing the liquid receiving chamber L3 and the one-side shaft member fluid path 42 to communicate with each other. In the screw portion 47, there is formed the other-side opening 41 for causing the compression-side chamber L2 and the other-side shaft member fluid path 43 to communicate with each other.

The rod cap 9 formed in a topped cylindrical shape includes a cylindrical portion 90 and a ceiling portion 91 that stops the opening of the base end side (upper side in FIG. 1) of the cylindrical portion 90. The rod cap 9 is housed in the cap member 7. The leading end (lower end in FIG. 1) of the cylindrical portion 90 abuts on the base end (upper end in FIG. 1) of the outer tube 4a. In the cylindrical portion 90, there is formed a first communicating hole 92 that passes through the cylindrical portion 90 in a radial direction and is connected to the one-side shaft member fluid path 42. Meanwhile, in the ceiling portion 91, there are formed an axial bore 93 that passes through the ceiling portion 91 in the axial direction and is connected to the other-side shaft member fluid path 43 and a second communicating hole 94 that passes through the ceiling portion 91 in the radial direction and is connected to the axial bore 93.

The cap member 7 serves as a support member that supports the base rod 4 as well as a sealing member that stops the chassis-side opening of the shock absorber main body T. As illustrated in FIG. 4, the cap member 7 includes: a rod holding portion 72 that is formed in an annular shape and protrudes to the inside of the shock absorber main body T with a threaded inner circumference; an annular case portion 73 extending to the external air side (upper side in FIG. 4) of the rod holding portion 72; and a housing portion 74 arranged in the side closest to the external air. The base end of the outer tube 4a is screwed to the inner circumference of the rod holding portion 72, and the rod cap 9 is housed in the inside of the case portion 73.

In the housing portion 74, there are formed a first installation hole 75, a second installation hole 76, and a third installation hole 77. The second expansion-side damping valve V6 is housed in the first installation hole 75, the second compression-side check valve V7 is housed in the second installation hole 76, and the second orifice valve V8 is housed in the third installation hole 77. In addition, as illustrated in FIGS. 3A and 3B, an air valve installation hole 78 for installing the air valve EV is formed in the housing portion 74. The second installation hole 76 is arranged vertically with respect to the center of the cap member 7. The first installation hole 75, the third installation hole 77, and the air valve installation hole 78 are arranged side by side around the second installation hole 76 in a radial shape with a slope such that the inner side end (lower end in FIG. 4) approaches the center line of the cap member 7.

Referring to FIG. 4, in the inner circumferential surface of the case portion 73, a one-side annular groove 73a having an annular shape is formed in a position facing the first communicating hole 92 of the rod cap. The one-side annular groove 73a forms a one-side annular passage 73b communicating to the outer circumferential surface of the rod cap 9 through the first communicating hole 92. In addition, in the inner circumferential surface of the case portion 73, a second annular groove 73c is formed in a position facing the second communicating hole 94 of the rod cap 9. The second annular groove 73c forms the other-side annular passage 73d communicating to the outer circumferential surface of the rod cap 9 through the second communicating hole 94.

An annular seal o5 is installed between the cap member 7 and the rod cap 9. The annular seal o5 prevents the one-side annular passage 73b and the other-side annular passage 73d from directly communicating with each other. In addition, the annular seal o6 is installed between the cap member 7 and the outer tube 4a. The annular seal o6 prevents the working fluid inside the one-side annular passage 73b from leaking to the cylinder gas chamber C2.

The first installation hole 75 communicates with the one-side annular passage 73b through a first through-hole 73e formed in the cap member 7 and also directly communicates with the other-side annular passage 73d. The first support member fluid path 70 includes the one-side annular passage 73b, the first through-hole 73e, the first installation hole 75, and the other-side annular passage 73d.

The second installation hole 76 directly communicates with the axial bore 93 of the rod cap 9 and communicates with the third installation hole 77 through the second through-hole 73f formed in the cap member 7. In addition, the third installation hole 77 communicates with the one-side annular passage 73b through the third through-hole 73g formed in the cap member 7. The second support member fluid path 71 includes the second installation hole 76, the second through-hole 73f, the third installation hole 77, the third through-hole 73g, and the one-side annular passage 73b.

As illustrated in FIG. 1, the second bypass path B2 includes the one-side opening 40, the one-side shaft member fluid path 42, the first communicating hole 92, the first support member fluid path 70, the second communicating hole 94, the axial bore 93, the other-side shaft member fluid path 43, and the other-side opening 41. The third bypass path B3 includes the other-side opening 41, the other-side shaft member fluid path 43, the axial bore 93, the second support member fluid path 71, the first communicating hole 92, the one-side shaft member fluid path 42, and the one-side opening 40. That is, the one-side opening 40, the other-side opening 41, the one-side shaft member fluid path 42, and the other-side shaft member fluid path 43 are shared by the second and third bypass paths B2 and B3. The first support member fluid path 70 is dedicated to the second bypass path B2. The second support member fluid path 71 is dedicated to the third bypass path B3.

As illustrated in FIG. 4, the second expansion-side damping valve V6 installed in the first installation hole 75 of the second bypass path B2 includes: a spherical valve body V6a that is arranged to face the first through-hole 73e and openably blocks an exit of the first through-hole 73e; a bias spring V6b that biases the valve body V6a toward the closing direction (first through-hole side); and an adjuster V6c that stops the opening of the first installation hole 75 in the external air side and can change a biasing force of the bias spring V6b. The second expansion-side damping valve V6 only allows the working fluid to pass through the second bypass path B2 and move from the liquid receiving chamber L3 to the compression-side chamber L2 and exerts relatively strong resistance to the working fluid passing through the second bypass path B2.

The second compression-side check valve V7 installed in the second installation hole 76 of the third bypass path B3 includes: a spherical valve body V7a that is arranged to face the axial bore 93 and openably stops an exit of the axial bore 93; a bias spring V7b that biases the valve body V7a toward a closing direction (axial bore side); and an adjuster V7c that stops the opening of the second installation hole 76 in the external air side and can change the biasing force of the bias spring V7b.

Similar to the second installation hole 76, the second orifice valve V8 installed in the third installation hole 77 of the third bypass path B3 includes a needle-like valve body V8a having a leading end inserted into the inside of the third through-hole 73g to form an orifice by narrowing the third bypass path B3, and an adjuster V8b extending to the external air side of the valve body V8a to stop the opening of the third installation hole 77 in the external air side. The fluid path area of the third bypass path B3 is adjusted by controlling the adjuster V8b.

That is, the liquid receiving chamber L3 and the compression-side chamber L2 communicate with each other through four paths, including the expansion-side base member fluid path 50, the compression-side base member fluid path 51, the second bypass path B2, and the third bypass path B3. In each path, the expansion-side check valve V3, the compression-side damping valve V4, the second expansion-side damping valve V6, the second compression-side check valve V7, and the second orifice valve V8 are installed in order to control a flow of the working fluid passing through each path. The type and configuration of the valves installed in each path are not limited those described above, but may be appropriately selected.

Next, the operation of the shock absorber D1 will be described.

When the piston velocity is in a low velocity range during expansion of the shock absorber D1, in which the inner tube T2 recedes from the outer tube T1, and the piston rod 2 recedes from the cylinder 1, the working fluid of the expansion-side chamber L1 compressed by the piston 3 passes through the orifice formed by the first orifice valve V5 and moves to the compression-side chamber L2 through the first bypass path B1. Accordingly, the working fluid corresponding to the volume of the piston rod receding from the cylinder 1 moves from the liquid receiving chamber L3 to the compression-side chamber L2. In this case, the working fluid of the liquid receiving chamber L3 opens the expansion-side check valve V3 and moves from the liquid receiving chamber L3 to the compression-side chamber L2 through the expansion-side base member fluid path 50. As a result, the free piston 6 moves to the lower side in FIG. 1.

The shock absorber D1 generates an expansion-side damping force caused by the resistance generated when the working fluid passes through the first bypass path B1 and the expansion-side base member fluid path 50. In addition, since the resistance exerted by the expansion-side check valve V3 to the working fluid is set to be relatively weak as described above, the shock absorber D1 primarily generates the expansion-side damping force caused by the resistance of the orifice formed by the first orifice valve V5 provided in the first bypass path B1. This expansion-side damping force can be adjusted by controlling the adjuster V5c of the first orifice valve V5.

When the piston velocity increases to a middle or high velocity range exceeding the low velocity range during expansion of the shock absorber D1, the working fluid of the expansion-side chamber L1 compressed by the piston opens the expansion-side damping valve V1 and moves to the compression-side chamber L2 through the expansion-side piston fluid path 30. The working fluid corresponding to the volume of the piston rod receding from the cylinder 1 opens the expansion-side check valve V3 and moves from the liquid receiving chamber L3 to the compression-side chamber L2 through the expansion-side base member fluid path 50. In addition, the working fluid opens the second expansion-side damping valve V6 and moves from the liquid receiving chamber L3 to the compression-side chamber L2 through the second bypass path B2, in which the working fluid passes through the one-side opening 40, the one-side shaft member fluid path 42, the first support member fluid path 70, the other-side shaft member fluid path 43, and the other-side opening 41 in this order. As a result, the free piston 6 moves to the lower side of FIG. 1.

The shock absorber D1 generates an expansion-side damping force caused by the resistance generated when the working fluid passes through the expansion-side piston fluid path 30, the expansion-side base member fluid path 50, and the second bypass path B2. In addition, since the resistance exerted by the expansion-side check valve V3 to the working fluid is set to be relatively weak as described above, the shock absorber D1 primarily generates the expansion-side damping force caused by the resistance of the expansion-side damping valve V1 installed in the expansion-side piston fluid path 30 and the second expansion-side damping valve V6 provided in the second bypass path B2. This expansion-side damping force can be adjusted by controlling the adjuster V6c of the second expansion-side damping valve V6.

When the piston velocity is in a low velocity range during contraction of the shock absorber D1, in which the inner tube T2 enters the inside of the outer tube T1, and the piston rod 2 enters the inside of the cylinder 1, the working fluid of the compression-side chamber L2 compressed by the piston 3 passes through the first bypass path B1 and moves to the expansion-side chamber L1. In addition, the working fluid opens the compression-side check valve V2 and moves to the expansion-side chamber L1 through the compression-side piston fluid path 31. The working fluid corresponding to the volume of the piston rod that enters the inside of the cylinder 1 opens the second compression-side check valve V7 and passes through the orifice formed in the second orifice valve V8. In addition, the working fluid moves from the compression-side chamber L2 to the liquid receiving chamber L3 through the third bypass path B3, in which the working fluid passes through the other-side opening 41, the other-side shaft member fluid path 43, the second support member fluid path 71, the one-side shaft member fluid path 42, and the one-side opening 40 in this order. As a result, the free piston 6 moves to the upper side in FIG. 1.

The shock absorber D1 generates a compression-side damping force caused by the resistance generated when the working fluid passes through the compression-side piston fluid path 31, the first bypass path B1, and the third bypass fluid path B3. In addition, since the resistance exerted by the compression-side check valve V2 and the second compression-side check valve V7 to the working fluid is set to be relatively weak as described above, the shock absorber D1 primarily generates a compression-side damping force caused by the resistance of the orifice formed by the second orifice valve V8 installed in the third bypass path B3. This compression-side damping force can be adjusted by controlling the adjuster V8c of the second orifice valve V8.

When the piston velocity increases to a middle or high velocity range exceeding the low velocity range during contraction of the shock absorber D1, the working fluid of the compression-side chamber L2 compressed by the piston 3 opens the compression-side check valve V2 and moves to the expansion-side chamber L1 through the compression-side piston fluid path 31. The working fluid corresponding to the volume of the piston rod entering the inside of the cylinder 1 opens the compression-side damping valve V4 and moves from the compression-side chamber L2 to the liquid receiving chamber L3 through the compression-side base member fluid path 51. As a result, the free piston 6 moves to the upper side in FIG. 1.

The shock absorber D1 generates a compression-side damping force caused by the resistance generated when the working fluid passes through the compression-side piston fluid path 31 and the compression-side base member fluid path 51. In addition, since the resistance exerted by the compression-side check valve V2 to the working fluid is set to be relatively weak as described above, the shock absorber D1 primarily generates a compression-side damping force caused by the resistance of the compression-side damping valve V4.

Next, the functions and effects of the shock absorber D1 will be described.

The shock absorber D1 includes: a liquid receiving chamber (chamber in one side) L3 and a compression-side chamber (chamber in the other side) L2 that contain the working fluid. In addition, the shock absorber D1 includes: the base rod (shaft member) 4 inserted from the liquid receiving chamber L3 through the compression-side chamber L2; the annular base member (partitioning wall) 5 held in the outer circumference of the base rod 4 to partition the liquid receiving chamber L3 and the compression-side chamber L2; the cap member (support member) 7 connected to the base end of the base rod 4 to support the base rod 4; and four paths for causing the liquid receiving chamber L3 and the compression-side chamber L2 to communicate with each other, including the expansion-side base member fluid path 50, the compression-side base member fluid path 51, the second bypass path B2, and the third bypass path B3. Furthermore, in each path, one or more valves are provided, including the expansion-side check valve V3, the compression-side damping valve V4, the second expansion-side damping valve V6, the second compression-side check valve V7, and the second orifice valve V8.

The second bypass path (bypass path) B2 includes: the one-side opening 40 formed in a portion where the base rod (shaft member) 4 is arranged inside the liquid receiving chamber (chamber in one side) L3 and opened to the liquid receiving chamber L3; the other-side opening 41 formed in a portion where the base rod 4 is arranged inside the compression-side chamber (chamber in the other side) L2 and opened to the compression-side chamber L2; the one-side shaft member fluid path 42 that is connected to the one-side opening 40 and passes through the inside of the base rod 4; the other-side shaft member fluid path 43 that is connected to the other-side opening 41 and passes through the inside of the base rod 4; and the first support member fluid path (support member fluid path) 70 formed in the inside of the cap member (support member) 7 to connect the one-side shaft member fluid path 42 and the other-side shaft member fluid path 43.

The third bypass path (bypass path) B3 includes: the one-side opening 40 formed in a portion where the base rod (shaft member) 4 is arranged inside the liquid receiving chamber (chamber in one side) L3 and opened to the liquid receiving chamber L3; the other-side opening 41 formed in a portion where the base rod 4 is arranged inside the compression-side chamber (chamber in the other side) and opened to the compression-side chamber L2; the one-side shaft member fluid path 42 that is connected to the one-side opening 40 and passes through the inside of the base rod 4; the other-side shaft member fluid path 43 that is connected to the other-side opening 41 and passes through the inside of the base rod 4; and the second support member fluid path (support member fluid path) 71 formed inside the cap member (support member) 7 to connect the one-side shaft member fluid path 42 and the other-side shaft member fluid path 43.

The cap member (support member) 7 houses the second expansion-side damping valve (valve) V6 provided in the second bypass path B2, the second compression-side check valve (valve) V7 provided in the third bypass path B3, and the second orifice valve (valve) V8.

That is, since the shock absorber D1 has the second and third bypass paths (bypass paths) B2 and B3, the working fluid in one of the liquid receiving chamber (chamber in one side) L3 and the compression-side chamber (chamber in the other side) L2 can pass through the inside of the base rod (shaft member) 4 and the cap member (support member) 7. Then, the working fluid can pass through the inside of the base rod 4 again and move to the other one of the liquid receiving chamber L3 and the compression-side chamber L2.

As a result, the valves for controlling a flow of the working fluid passing through the second and third bypass paths (bypass paths) B2 and B3, that is, the second expansion-side damping valve V6, the second compression-side check valve V7, and the second orifice valve V8, can be housed in the cap member (support member) 7. In addition, the valve bodies V6a, V7a, and V8a of the second expansion-side damping valve V6, the second compression-side check valve V7, and the second orifice valve V8, respectively, can also be arranged inside the cap member (support member) 7. Therefore, it is possible to shorten a distance between the adjusters V6c, V7c, and V8b, serving as an operating portion, and the valve bodies V6a, V7a, and V8a, respectively. Therefore, dissimilar to the shock absorber D3 of the related art, it is possible to adjust each valve without using the push rod 24.

Therefore, even when the second expansion-side damping valve V6, the second compression-side check valve V7, and the second orifice valve V8 are adjustable type valves, so that the expansion-side damping force in the case of a middle or high piston velocity range and the compression-side damping force in the case of a low piston velocity range are adjustable, it is possible to prevent a complicated structure of the shock absorber D1.

The second and third bypass paths B2 and B3 are used as a bypass path that causes the liquid receiving chamber (chamber in one side) L3 and the compression-side chamber (chamber in the other side) L2 to communicate with each other. In addition, the one-side opening 40, the other-side opening 41, the one-side shaft member fluid path 42, and the other-side shaft member fluid path 43 are shared by the second and third bypass paths B2 and B3.

Therefore, even when the shock absorber D1 has a plurality of bypass paths for causing the liquid receiving chamber (chamber in one side) L3 and the compression-side chamber (chamber in the other side) L2 to communicate with each other, it may be preferable that a dedicated support member fluid path be provided for each bypass path. In this case, it is possible to prevent a complicated structure of the shock absorber D1 that may be caused by an increasing number of the bypass paths. Similarly, even when a pair of valves, including the second compression-side check valve V7 and the second orifice valve V8, are provided in the third bypass path B3 in series, it is possible to prevent a remarkably complicated structure of the shock absorber D1.

The base rod (shaft member) 4 has a dual tube structure having the outer tube 4a and the inner tube 4c. In addition, the one-side shaft member fluid path 42 is formed between the outer tube 4a and the inner tube 4c, and the other-side shaft member fluid path 43 is formed in the inside of the inner tube 4c.

Therefore, it is possible to easily form the one-side shaft member fluid path 42 and the other-side shaft member fluid path 43 in the base rod (shaft member) 4. Therefore, it is possible to prevent a complicated processing of the base rod 4.

Furthermore, the shock absorber D1 has a shock absorber main body T including the outer tube T1 and the inner tube T2 retractably inserted into the inside of the outer tube T1. The liquid receiving chamber (chamber in one side) L3 and the compression-side chamber (chamber in the other side) L2 are formed inside the shock absorber main body T. A support member that supports the base rod (shaft member) 4 is the cap member 7 that stops the chassis-side opening of the shock absorber main body T.

That is, the second expansion-side damping valve V6, the second compression-side check valve V7, and the second orifice valve V8 provided in the second and third bypass paths (bypass paths) B2 and B3 that cause the liquid receiving chamber (chamber in one side) L3 and the compression-side chamber (chamber in the other side) L2 to communicate with each other are arranged in the chassis side. Therefore, it is possible to easily perform a valve exchange work or an adjustment work. In addition, it is possible to easily exchange the cap member 7. Therefore, it is possible to easily change the number or the type of the bypass paths by replacing the cap member 7 with a cap member where a different support member fluid path is formed.

Next, a second embodiment will be described.

Figure 5:
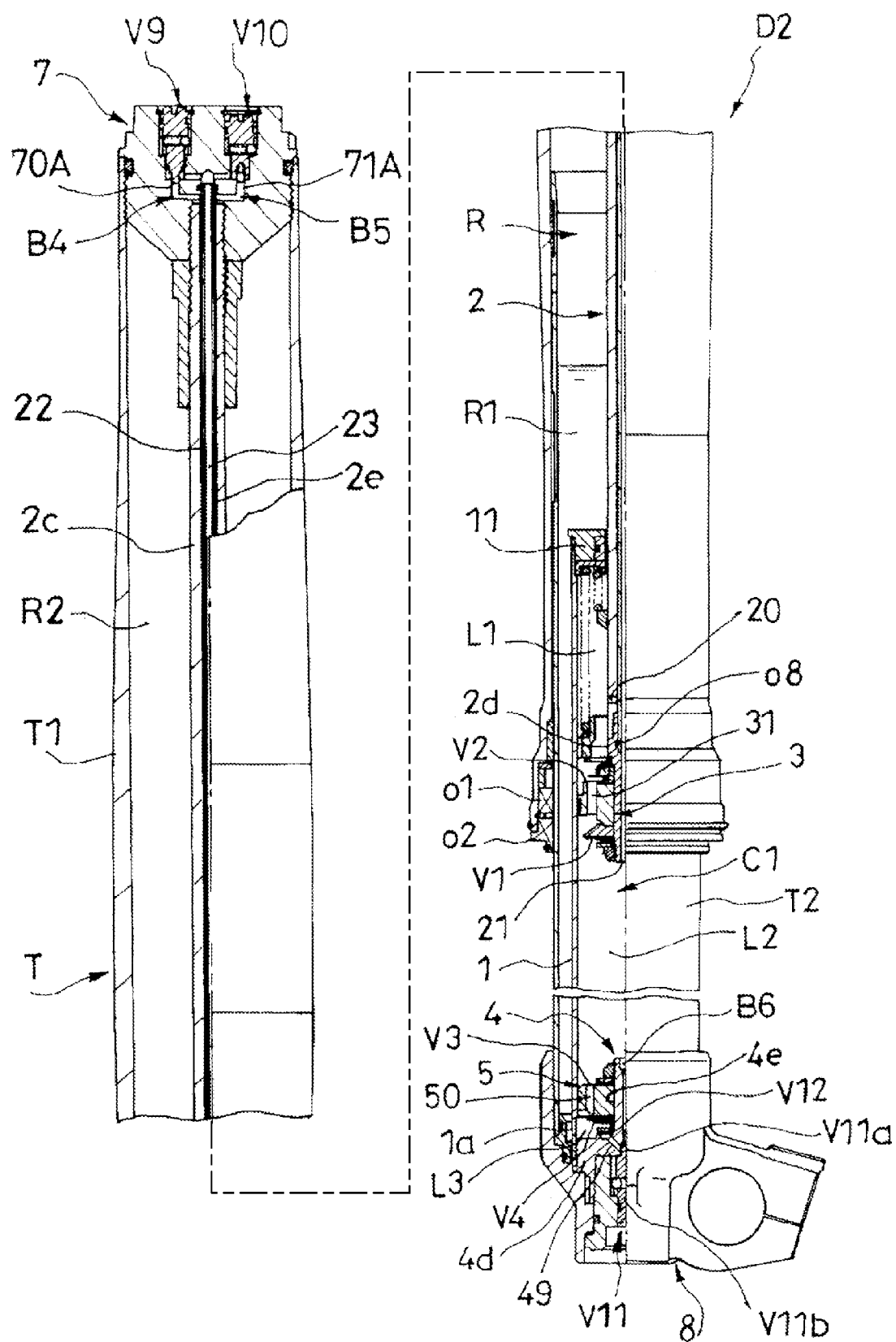
FIG. 5 is a partially cut-away front view illustrating a shock absorber according to a second embodiment of the present invention.

Similar to the shock absorber D1 of the first embodiment, as illustrated in FIG. 5, the shock absorber D2 according to the second embodiment has a shock absorber main body T including an outer tube T1 connected to the chassis side and an inner tube T2 connected to the wheel side. A cap member 7, a bottom member 8, an oil seal o1, and a dust seal o2 are installed in the shock absorber main body T. As a result, the inside of the shock absorber main body T is sealed from the external air, and it is possible to prevent a liquid or gas contained in the shock absorber main body T from leaking to the external side.

The shock absorber D2 includes: a cylinder 1 erected in the shaft center portion of the shock absorber main body T; a piston rod 2 inserted into or retracted from the inside of the cylinder 1 as the shock absorber D2 contracts or expands; a piston 3 held in the leading end of the piston rod 2 to make sliding contact with the inner circumferential surface of the cylinder 1; a base rod 4 erected in a shaft center portion of the piston rod opposite side (lower side in FIG. 5) of the cylinder 1; and a base member 5 held in the leading end of the base rod 4.

The cylinder 1 is held in the bottom member 8, and the opening in the bottom member opposite side (upper side in FIG. 5) is blocked by the annular rod guide 11. Inside the cylinder 1, there is formed a cylinder liquid chamber C1 where an working fluid made of a liquid such as oil, water, and a water solution is filled. Similar to the first embodiment, the shock absorber D2 according to the second embodiment is a hydraulic shock absorber in which a liquid is used as the working fluid. However, a pneumatic shock absorber in which a gas is used as the working fluid may also be employed.

A reservoir R is defined between the cylinder 1 and the shock absorber main body T. In the reservoir R, there are formed a reservoir liquid chamber R1 that contains the working fluid and a reservoir gas chamber R2 that is arranged over the liquid level of the reservoir liquid chamber R1 and contains a gas. A compressed gas is hermetically encapsulated inside the reservoir gas chamber R2, which serves as a suspension spring (air spring). The reservoir gas chamber R2 biases the shock absorber D2 to an expansion direction at all times to elastically support the chassis. A reactive force of the suspension spring (air spring) can be adjusted using an air valve (not illustrated) installed in the cap member 7.

The cylinder liquid chamber C1 formed inside the cylinder 1 is partitioned by the piston 3 and the base member 5 in the axial direction. The cylinder liquid chamber C1 includes: an expansion-side chamber L1 formed between the rod guide 11 and the piston 3; a compression-side chamber L2 formed between the piston 3 and the base member 5; and a liquid receiving chamber L3 formed in the bottom member side (lower side in FIG. 5) of the base member 5. The liquid receiving chamber L3 communicates with the reservoir liquid chamber R1 through the orifice 1a formed in the cylinder 1 at all times.

The piston 3 that partitions the expansion-side chamber L1 and the compression-side chamber L2 is formed in an annular shape and is held in the outer circumference of the piston rod 2. The piston 3 includes a compression-side piston fluid path 31 and an expansion-side piston fluid path (not illustrated) for causing the expansion-side chamber L1 and the compression-side chamber L2 to communicate with each other. The expansion-side piston fluid path is provided with the expansion-side damping valve V1 similar to that of the first embodiment, and the compression-side piston fluid path 31 is provided with the compression-side check valve V2 similar to that of the first embodiment.

The base member 5 that partitions the liquid receiving chamber L3 and the compression-side chamber L2 is formed in an annular shape and is held in the outer circumference of the base rod 4. In the base member 5, there are formed a compression-side base member fluid path and an expansion-side base member fluid path 50 for causing the liquid receiving chamber L3 and the compression-side chamber L2 to communicate with each other. The expansion-side base member fluid path 50 is provided with the expansion-side check valve V3 similar to that of the first embodiment, and the compression-side base member fluid path is provided with the compression-side damping valve V4 similar to that of the first embodiment.

The piston rod 2 that holds the piston 3 has a dual tube structure including a tubular outer tube 2c having a base end (upper end in FIG. 5) screwed to the cap member 7, an annular center rod 2d screwed to the inner circumference of the leading end (lower end in FIG. 5) of the outer tube 2c, and a tubular inner tube 2e that is inserted from the outer tube 2c through the center rod 2d and has a base end (upper end in FIG. 5) protruding from the outer tube 2c.

Figure 6:
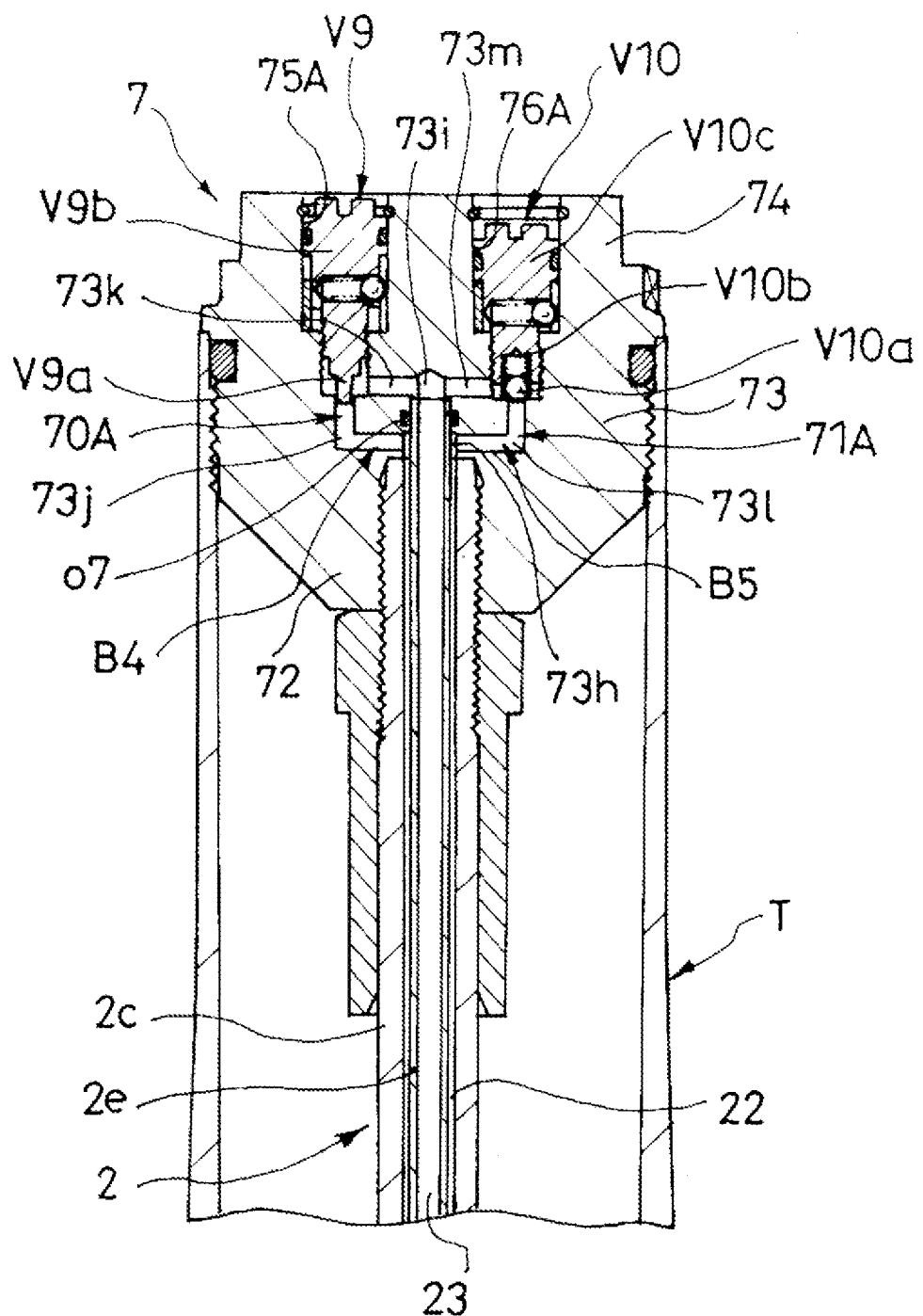
FIG. 6 is a partially enlarged cross-sectional view illustrating main parts of FIG. 5.

As illustrated in FIG. 6, a one-side shaft member fluid path 22 having a tubular shape is formed between the outer tube 2c and the inner tube 2e, and the other-side shaft member fluid path 23 is formed inside the inner tube 2e. In the leading end (lower end in FIG. 5) of the outer tube 2c arranged inside the expansion-side chamber L1, there is formed a one-side opening 20 that causes the expansion-side chamber L1 and the one-side shaft member fluid path 22 to communicate with each other. In the leading end (lower end in FIG. 5) of the center rod 2d protruding to the inside of the compression-side chamber L2 from the piston 3, there is formed the other-side opening 21 that causes the compression-side chamber L2 and the other-side shaft member fluid path 23 to communicate with each other.

The cap member 7 serves as a support member that supports the piston rod 2 as well as an encapsulating member that stops the chassis-side opening of the shock absorber main body T. As illustrated in FIG. 6, the cap member 7 includes: a rod holding portion 72 formed in an annular shape with a threaded inner circumference, to which a base end (upper end in FIG. 6) of the outer tube 2c is screwed; a case portion 73 formed in an annular shape extending to the external air side of the rod holding portion 72 and having an inner circumference where the base end (upper end in FIG. 6) of the inner tube 2e is inserted; and a housing portion 74 arranged in the side closest to the external air.

In the housing portion 74, there are formed first and second installation holes 75A and 76A. The first orifice valve V9 is housed in the installation hole 75A, and the second expansion-side damping valve V10 is housed in the installation hole 76A. An annular gap 73h communicating with the one-side shaft member fluid path 22 is formed between the inner circumferential surface of the case portion 73 and the outer circumferential surface of the base end (upper end in FIG. 6) of the inner tube 2e. In the cap member 7, an axial bore 73i communicating with the other-side shaft member fluid path 23 is formed in a portion facing the base end (upper end in FIG. 6) of the inner tube 2e. The annular seals o7 and o8 are installed in a portion between the cap member 7 and the base end (upper end in FIG. 6) of the inner tube 2e and a portion between the center rod 2d and the leading end (lower end in FIG. 5) of the inner tube 2e, respectively. The seal o7 in the base end side of the inner tube 2e prevents the annular gap 73h and the axial bore 73i from directly communicating with each other. The seal o8 in the leading end side of the inner tube 2e prevents the one-side shaft member fluid path 22 and the other-side shaft member fluid path 23 from directly communicating with each other.

The first installation hole 75A communicates with the annular gap 73h through the first through-hole 73j formed in the cap member 7 and the axial bore 73i through the second through-hole 73k formed in the cap member 7. The first support member fluid path 70A includes the annular gap 73h, the first through-hole 73j, the first installation hole 75A, the second through-hole 73k, and the axial bore 73i.

The second installation hole 76A communicates with the annular gap 73h through the third through-hole 73l formed in the cap member 7 and communicates with the axial bore 73i through the fourth through-hole 73m formed in the cap member 7. The second support member fluid path 71A includes the annular gap 73h, the third through-hole 731, the second installation hole 76A, the fourth through-hole 73m, and the axial bore 73i.

The first bypass path B4 includes the one-side opening 20 (FIG. 5), the one-side shaft member fluid path 22, the first support member fluid path 70A, the other-side shaft member fluid path 23, and the other-side opening 21 (FIG. 5). The second bypass path B5 includes the one-side opening 20 (FIG. 5), the one-side shaft member fluid path 22, the second support member fluid path 71A, the other-side shaft member fluid path 23, and the other-side opening 21 (FIG. 5). That is, the one-side opening 20, the other-side opening 21, the one-side shaft member fluid path 22, and the other-side shaft member fluid path 23 are shared by the first and second bypass paths B4 and B5. The first support member fluid path 70A is dedicated to the first bypass path B4. The second support member fluid path 71A is dedicated to the second bypass path B5.

As illustrated in FIG. 6, the first orifice valve V9 installed in the first installation hole 75A of the first bypass path B4 includes: a needle-like valve body V9a having a leading end inserted into the first through-hole 73j to form an orifice by narrowing the first bypass path B4; and an adjuster V9b extending to the external air side of the valve body V9a to stop the external air side opening of the first installation hole 75A. The fluid path area of the first bypass path B4 is adjusted by controlling the adjuster V9b.

The second expansion-side damping valve V10 installed in the second installation hole 76A of the second bypass path B5 includes: a spherical valve body V10a arranged to face the third through-hole 731 to openably block an exit of the third through-hole 731; a bias spring V10b that biases the valve body V10a toward a closing direction (in the third through-hole side); and an adjuster V10c that stops the external air side opening of the second installation hole 76A and changes a biasing force of the bias spring V10b. The second expansion-side damping valve V10 only allows the working fluid to pass through the second bypass path B5 and move from the expansion-side chamber L1 to the compression-side chamber L2 and exerts relatively high resistance to the working fluid passing through the second bypass path B5.

That is, the expansion-side chamber L1 communicates with the compression-side chamber L2 through four paths, including the expansion-side piston fluid path (not illustrated), the compression-side piston fluid path 31, the first bypass path B4, and the second bypass path B5. Each path is provided with a valve for controlling a flow of the working fluid passing through each path, such as the expansion-side damping valve V1, the compression-side check valve V2, the first orifice valve V9, and the second expansion-side damping valve V10. In addition, the types and the configurations of the valves provided in each path are not limited to those described above, but may be appropriately selected.

As illustrated in FIG. 5, the base rod 4 that holds the base member 5 includes: an annular base end 4d connected to the bottom member 8; and a cylindrical rod main body 4e erected from the base end 4d to the inside of the shock absorber main body T. In the base end 4d of the base rod 4, there is formed an orifice 49 that causes the inside of the base end 4d and the liquid receiving chamber L3 to communicate with each other. The third bypass path B6 that causes the liquid receiving chamber L3 and the compression-side chamber L2 to communicate with each other includes the orifice 49, the inside of the base end 4d, and the inside of the rod main body 4e.

The third bypass path B6 is provided with a second orifice valve V11 and a second compression-side check valve V12 in series. The second orifice valve V11 includes: a needle-like valve body V11a having a leading end inserted into the inside of the third bypass path B6 to form an orifice by narrowing the fluid path area of the third bypass path B6; and an adjuster V11b that extends to the external air side of the valve body V11a and is connected to the bottom member 8. The fluid path area of the third bypass path B6 can be adjusted by controlling the adjuster V11b. Meanwhile, the second compression-side check valve V12 only allows the working fluid to pass through the third bypass path B6 and move from the compression-side chamber L2 to the liquid receiving chamber L3 and exerts relatively low resistance to the working fluid passing through the third bypass path B6.

That is, the liquid receiving chamber L3 communicates with the compression-side chamber L2 through three paths, including the expansion-side base member fluid path 50, the compression-side base member fluid path (not illustrated), and the third bypass path B6. Each path is provided with a valve for controlling a flow of the working fluid passing through each path, such as the expansion-side check valve V3, the compression-side damping valve V4, the second orifice valve V11, and the second compression-side check valve V12. In addition, the types and the configurations of the valves provided in each path are not limited to those described above, but may be appropriately selected.

Next, the operation of the shock absorber D2 will be described.

When the piston velocity is in a low velocity range during expansion of the shock absorber D2, in which the inner tube T2 recedes from the outer tube T1, and the piston rod 2 recedes from the cylinder 1, the working fluid in the expansion-side chamber L1 compressed by the piston 3 passes through the orifice formed by the first orifice valve V9 and moves to the compression-side chamber L2 through the first bypass path B4, in which the working fluid passes through the one-side opening 20, the one-side shaft member fluid path 22, the first support member fluid path 70A, the other-side shaft member fluid path 23, and the other-side opening 21 in this order. Accordingly, the working fluid corresponding to the volume of the piston rod receding from the cylinder 1 opens the expansion-side check valve V3 and moves from the liquid receiving chamber L3 to the compression-side chamber L2 through the expansion-side base member fluid path 50.

The shock absorber D2 generates an expansion-side damping force caused by the resistance generated when the working fluid passes through the first bypass path B4 and the expansion-side base member fluid path 50. In addition, since the resistance exerted by the expansion-side check valve V3 to the working fluid is set to be relatively weak, the shock absorber D2 principally generates the expansion-side damping force caused by the resistance of the orifice formed by the first orifice valve V9 provided in the first bypass path B4. This expansion-side damping force can be adjusted by controlling the adjuster V9b of the first orifice valve V9.

When the piston velocity increases to a middle or high velocity range exceeding the low velocity range during expansion of the shock absorber D2, the working fluid of the expansion-side chamber L1 compressed by the piston opens the expansion-side damping valve V1 and moves to the compression-side chamber L2 through the expansion-side piston fluid path (not illustrated). In addition, the working fluid opens the second expansion-side damping valve V10 and moves to the compression-side chamber L2 through the second bypass path B5, in which the working fluid passes through the one-side opening 20, the one-side shaft member fluid path 22, the second support member fluid path 71A, the other-side shaft member fluid path 23, and the other-side opening 21 in this order. The working fluid corresponding to the volume of the piston rod receding from the cylinder 1 opens the expansion-side check valve V3 and moves from the liquid receiving chamber L3 to the compression-side chamber L2 through the expansion-side base member fluid path 50.

The shock absorber D2 generates an expansion-side damping force caused by the resistance generated when the working fluid passes through the expansion-side piston fluid path (not illustrated), the second bypass path B5, and the expansion-side base member fluid path 50. In addition, the resistance exerted by the expansion-side check valve V3 to the working fluid is set to be relatively weak as described above, the shock absorber D2 principally generates the expansion-side damping force caused by the resistance of the expansion-side damping valve V1 provided in the expansion-side piston fluid path and the second expansion-side damping valve V10 provided in the second bypass path B5. This expansion-side damping force can be adjusted by controlling the adjuster V10c of the second expansion-side damping valve V10.

When the piston velocity is in a low velocity range during contraction of the shock absorber D2, in which the inner tube T2 enters the inside of the outer tube T1, and the piston rod 2 enters the inside of the cylinder 1, the working fluid of the compression-side chamber L2 compressed by the piston 3 passes through the orifice formed by the first orifice valve V9 and moves to the expansion-side chamber L1 through the first bypass path B4, in which the working fluid passes through the other-side opening 21, the other-side shaft member fluid path 23, the first support member fluid path 70A, the one-side shaft member fluid path 22, and the one-side opening 20. In addition, the working fluid opens the compression-side check valve V2 and moves to the expansion-side chamber L1 through the compression-side piston fluid path 31. The working fluid corresponding to the volume of the piston rod entering the inside of the cylinder 1 passes through the orifice formed by the second orifice valve V11 and opens the second compression-side check valve V12 so as to move from the compression-side chamber L2 to the liquid receiving chamber L3 through the third bypass path B6.

The shock absorber D2 generates a compression-side damping force caused by the resistance generated when the working fluid passes through the first bypass path B4, the compression-side piston fluid path 31, and the third bypass path B6. In addition, since the resistance exerted by the compression-side check valve V2 and the second compression-side check valve V12 to the working fluid is set to be relatively weak as described above, the shock absorber D2 principally generates the compression-side damping force caused by the resistance of the orifice formed by the second orifice valve V11 provided in the third bypass path B6. This compression-side damping force can be adjusted by controlling the adjuster V11b of the second orifice valve V11.

When the piston velocity increases to a middle or high velocity range exceeding the low velocity range during contraction of the shock absorber D2, the working fluid of the compression-side chamber L2 compressed by the piston 3 opens the compression-side check valve V2 and moves to the expansion-side chamber L1 through the compression-side piston fluid path 31. The working fluid corresponding to the volume of the piston rod entering the inside of the cylinder 1 opens the compression-side damping valve V4 and moves from the compression-side chamber L2 to the liquid receiving chamber L3 through the compression-side base member fluid path (not illustrated).

The shock absorber D2 generates the compression-side damping force caused by the resistance generated when the working fluid passes through the compression-side piston fluid path 31 and the compression-side base member fluid path (not illustrated). Since the resistance exerted by the compression-side check valve V2 to the working fluid is set to be relatively weak as described above, the shock absorber D2 principally generates the compression-side damping force caused by the resistance of the compression-side damping valve V4.

Next, the functions and effects of the shock absorber D2 will be described.

The shock absorber D2 includes: the expansion-side chamber (chamber in one side) L1 and the compression-side chamber (chamber in the other side) L2 for containing the working fluid; the piston rod (shaft member) 2 inserted from the expansion-side chamber L1 through the compression-side chamber L2; the annular piston (partitioning wall) 3 held in the outer circumference of the piston rod 2 to partition the expansion-side chamber L1 and the compression-side chamber L2; the cap member (support member) 7 connected to the base end of the piston rod 2 to support the piston rod 2; four paths for causing the expansion-side chamber L1 and the compression-side chamber L2 to communicate with each other, including the expansion-side piston fluid path, the compression-side piston fluid path 31, the first bypass path B4, and the second bypass path B5; and the valves provided in each path, including the expansion-side damping valve V1, the compression-side check valve V2, the first orifice valve V9, and the second expansion-side damping valve V10.

The first bypass path (bypass path) B4 includes: the one-side opening 20 formed in a portion where the piston rod (shaft member) 2 is formed inside the expansion-side chamber (chamber in one side) L1 to communicate with the expansion-side chamber L1; the other-side opening 21 formed in a portion where the piston rod 2 is arranged inside the compression-side chamber (chamber in the other side) L2 to communicate with the compression-side chamber L2; the one-side shaft member fluid path 22 extending to the one-side opening 20 and passing through the inside of the piston rod 2; the other-side shaft member fluid path 23 extending to the other-side opening 21 and passing through the inside of the piston rod 2; and the first support member fluid path (support member fluid path) 70A formed inside the cap member (support member) 7 to connect the one-side shaft member fluid path 22 and the other-side shaft member fluid path 23.

The second bypass path (bypass path) B5 includes: the one-side opening 20 formed in a portion where the piston rod (shaft member) 2 is arranged inside the expansion-side chamber (chamber in one side) L1 to communicate with the expansion-side chamber L1; the other-side opening 21 formed in a portion where the piston rod 2 is arranged inside the compression-side chamber (chamber in the other side) L2 to communicate with the compression-side chamber L2; the one-side shaft member fluid path 22 extending to the one-side opening 20 and passing through the inside of the piston rod 2; the other-side shaft member fluid path 23 extending to the other-side opening 21 and passing through the inside of the piston rod 2; and the second support member fluid path (support member fluid path) 71A formed inside the cap member (support member) 7 to connect the one-side shaft member fluid path 22 and the other-side shaft member fluid path 23.

The cap member (support member) 7 houses the first orifice valve (valve) v9 provided in the first bypass path B4 and the second expansion-side damping valve (valve) V10 provided in the second bypass path B5.

That is, since the shock absorber D2 has the first and second bypass paths (bypass paths) B4 and B5, the working fluid in one of the expansion-side chamber (chamber in one side) L1 and the compression-side chamber (chamber in the other side) L2 can pass through the piston rod (shaft member)

2 and the cap member (support member) 7. Then, the working fluid can pass through the piston rod 2 again and move to the other one of the expansion-side chamber L1 and the compression-side chamber L2.

As a result, valves for controlling a flow of the working fluid passing through the first and second bypass paths (bypass paths) B4 and B5, that is, the first orifice valve V9 and the second expansion-side damping valve V10 can be housed in the cap member (support member) 7. Since the valve bodies V9a and V10a of the first orifice valve V9 and the second expansion-side damping valve V10, respectively, can also be arranged inside the cap member (support member) 7, it is possible to shorten a distance between the adjusters V9b and V10c serving as an operating portion and the valve bodies V9a and V10a, respectively. Therefore, dissimilar to the shock absorber D3 of the related art, it is possible to adjust each valve without using the push rod 24.

Therefore, even when the first orifice valve V9 and the second expansion-side damping valve V10 are adjustable type valves, so that the expansion-side damping force in the case of a low piston velocity range and the expansion-side damping force in the case of a middle and high piston velocity range are adjustable, it is possible to prevent a complicated structure of the shock absorber D2.

The first and second bypass paths B4 and B5 are used as a bypass path that causes the expansion-side chamber (chamber in one side) L1 and the compression-side chamber (chamber in the other side) L2 to communicate with each other. In addition, the one-side opening 20, the other-side opening 21, the one-side shaft member fluid path 22, and the other-side shaft member fluid path 23 are shared by the first and second bypass paths B4 and B5.

Therefore, even when the shock absorber D2 has a plurality of bypass paths for causing the expansion-side chamber (chamber in one side) L1 and the compression-side chamber (chamber in the other side) L2 to communicate with each other, it may be preferable that a dedicated support member fluid path be provided for each bypass path. In this case, it is possible to prevent a complicated structure of the shock absorber D2 that may be caused by an increasing number of the bypass paths.

Furthermore, the piston rod (shaft member) 2 has a dual tube structure including the outer tube 2c and the inner tube 2e. The one-side shaft member fluid path 22 is formed between the outer tube 2c and the inner tube 2e, and the other-side shaft member fluid path 23 is formed in the inside of the inner tube 2e.

Therefore, it is possible to easily form the one-side shaft member fluid path 22 and the other-side shaft member fluid path 23 in the piston rod (shaft member) 2. Therefore, it is possible to prevent a complicated processing of the piston rod 2.

Furthermore, the shock absorber D2 has a shock absorber main body T including the outer tube T1 and the inner tube T2 retractably inserted into the inside of the outer tube T1. The expansion-side chamber (chamber in one side) L1 and the compression-side chamber (chamber in the other side) L2 are formed inside the shock absorber main body T. A support member that supports the piston rod (shaft member) 2 is the cap member 7 that stops the chassis-side opening of the shock absorber main body T.

That is, the first orifice valve V9 and the second expansion-side damping valve V10, provided in the first and second bypass paths (bypass paths) B4 and B5 that cause the expansion-side chamber (chamber in one side) L1 and the compression-side chamber (chamber in the other side) L2 to communicate with each other, are also arranged in the chassis side.

Therefore, it is possible to easily perform a valve exchange work or an adjustment work. In addition, it is possible to easily exchange the cap member 7. Therefore, it is possible to easily change the number or the type of the bypass paths by replacing the cap member 7 with a cap member where a different support member fluid path is formed.

The embodiments of the present invention described above are merely illustration of some application examples of the present invention and not of the nature to limit the technical scope of the present invention to the specific constructions of the above embodiments.

For example, although description in the aforementioned embodiments has been made by assuming that the shock absorber D1 or D2 is a shock absorber for a front fork that suspends a front wheel in a saddled vehicle such as a two-wheeled or three-wheeled vehicle, the present invention may also be applied to a shock absorber for a rear cushion unit that suspends a rear wheel in a saddled vehicle or a shock absorber for other vehicles such as an automobile.

In addition, although description in the aforementioned embodiments has been made by assuming that the shock absorber D1 or D2 is an inverted type, in which the outer tube T1 is connected to the chassis side, and the inner tube T2 is connected to the wheel side, the present invention may also be applied to an upright type shock absorber D1 or D2, in which the outer tube T1 is connected to the wheel side, and the inner tube T2 is connected to the chassis side.

Although the piston velocity is classified into a low velocity range and a middle and high velocity range in the aforementioned description, a threshold value of each range may be set arbitrarily.

In the first embodiment, the number of the bypass paths for causing the liquid receiving chamber (chamber in one side) L3 and the compression-side chamber (chamber in the other side) L2 to communicate with each other is set to two (that is, the second and third bypass paths B2 and B3). In the second embodiment, the number of the bypass paths for causing the expansion-side chamber (chamber in one side) L1 and the compression-side chamber (chamber in the other side) L2 is set to two (that is, the first and second bypass paths B4 and B5). However, the number of bypass paths for causing the chamber in one side and the chamber in the other side to communicate with each other may be set to any number such as one, three, or more.

All of the valves provided in the second and third bypass paths B2 and B3 of the first embodiment and the first and second bypass paths B4 and B5 of the second embodiment, that is, the second expansion-side damping valve V6, the second compression-side check valve V7, the second orifice valve V8, the first orifice valve V9, and the second expansion-side damping valve V10 are an adjustable type. However, only a part of them may be an adjustable type.

Since the first and second support member fluid paths 70, 70A, 71, and 71A are formed in the cap member (support member) 7, it is possible to easily change the type of the bypass path that causes the chamber in one side and the chamber in the other side to communicate with each other by changing the number of the support member fluid paths. However, the one-side opening, the other-side opening, the one-side shaft member fluid path, and the other-side shaft member fluid path may be dedicated to each bypass path.

The base rod 4 and the piston rod 2 serving as the shaft member have a dual tube structure including the outer tubes 4a and 2c and the inner tubes 4c and 2e, respectively. In addition, the one-side shaft member fluid paths 42 and 22 are formed between the outer tubes 4a and 2c and the inner tubes 4c and 2e, and the other-side shaft member fluid paths 43 and 23 are formed inside the inner tubes 4c and 2e, respectively. However, a method of forming the one-side shaft member fluid paths 42 and 22 and the other-side shaft member fluid paths 43 and 23 is not limited to that described above, but may be selected arbitrarily.

Figure 7:
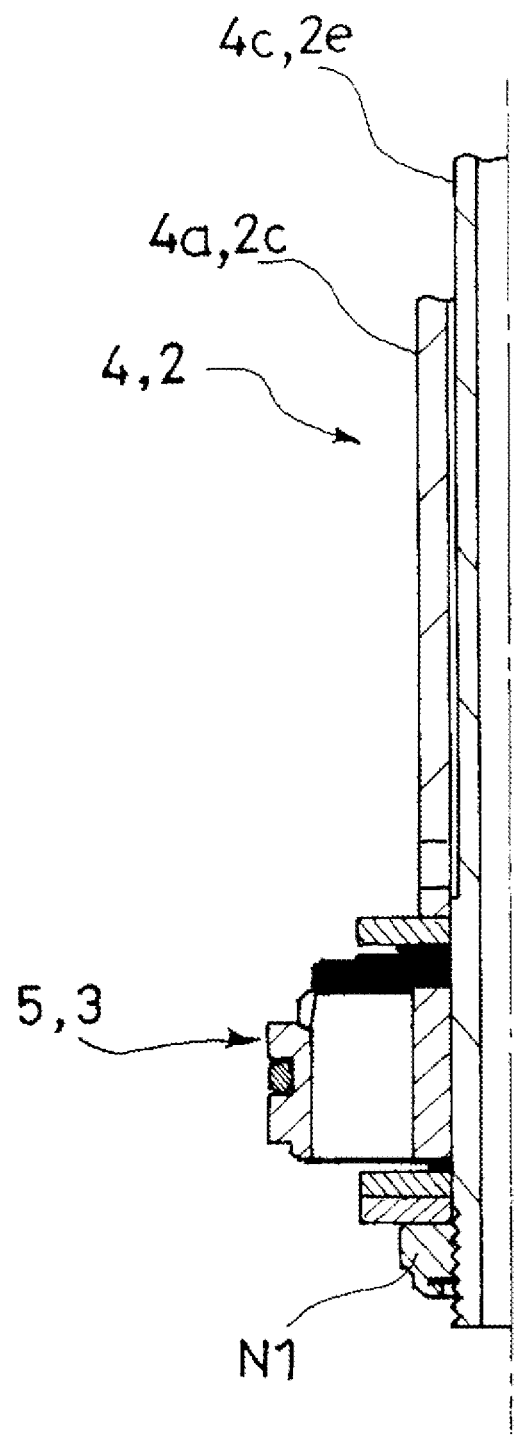
FIG. 7 is a cross-sectional view illustrating a modification of the shock absorber according to the first and second embodiments by enlarging the modified portions.
Figure 8:
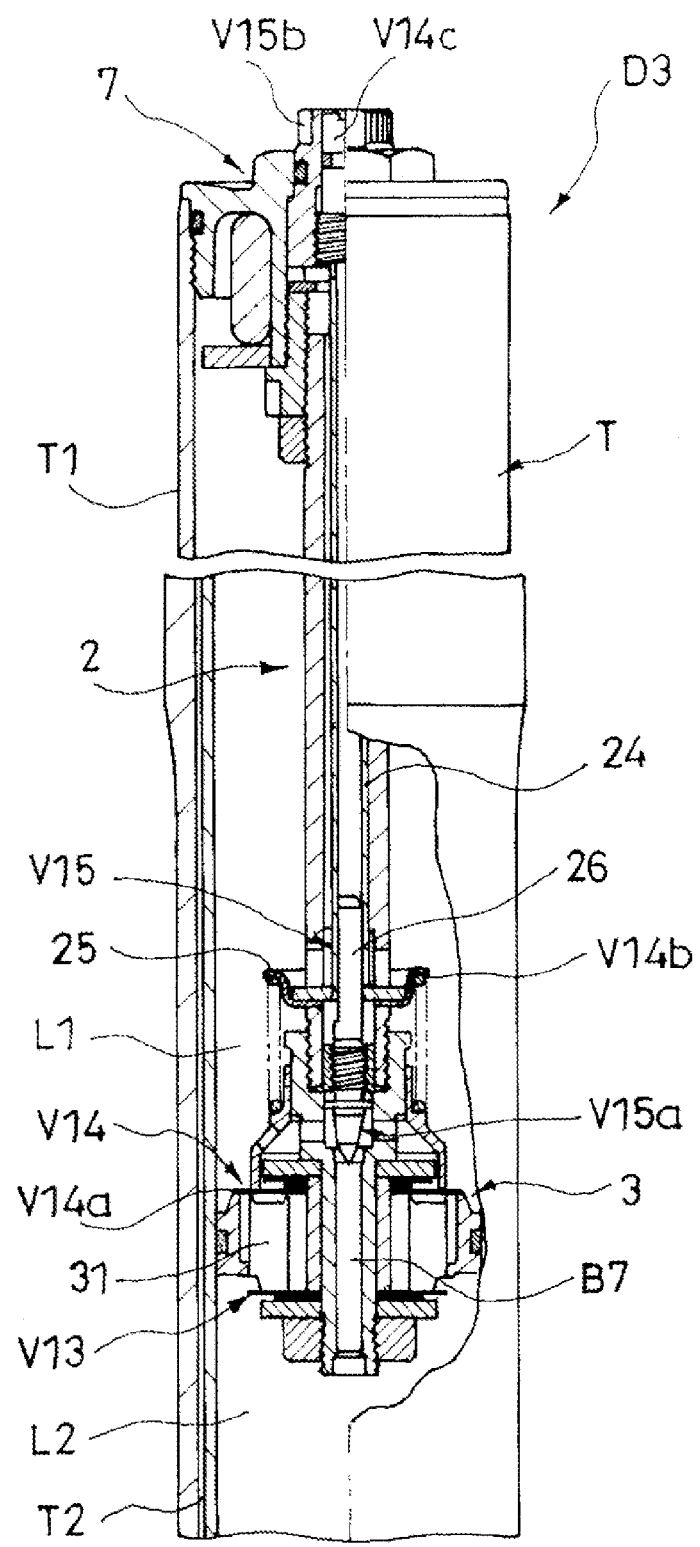
FIG. 8 is a partially cut-away front view illustrating main parts of the shock absorber in the related art.

In addition, the base rod 4 of the first embodiment and the piston rod 2 of the second embodiment serving as a shaft member have the outer tubes 4a and 2c, the inner tubes 4c and 2e, and the center rods 4b and 2d, and the base member 5 and the piston 3 serving as a partitioning wall are held in the outer circumferences of the center rods 4b and 2d, respectively. However, as illustrated in FIG. 7, the leading end (lower end in FIG. 7) of the inner tube 4c or 2e of the base rod 4 of the first embodiment or the piston rod 2 of the second embodiment may protrude from the outer tube 4a or 2c, and this protrusion may be inserted into the shaft center portion of the base member 5 of the first embodiment or the piston 3 of the second embodiment. In addition, a nut N1 may be screwed to the leading end such that the partitioning wall is interposed between the nut N1 and the leading end (lower end in FIG. 2) of the outer tube 4a or 2a.

Although description in the aforementioned embodiments has been made by assuming that the support member that supports the base rod 4 and the piston rod 2 serving as a shaft member is the cap member 7, the bottom member 8 may serve as the support member instead of the cap member 7.

The present application claims a priority based on Japanese Patent Application No. 2012-236182 filed with the Japan Patent Office on Oct. 26, 2012, all the contents of which are hereby incorporated by reference.

What is claimed is:

1. A shock absorber comprising:
a chamber disposed in a first side and a chamber disposed in a second side that each contain a working fluid;
a shaft member inserted from the chamber in the first side through the chamber in the second side;
an annular partitioning wall held in an outer circumference of the shaft member to partition the chamber in the first side and the chamber in the second side;
a support member connected to a base end of the shaft member to support the shaft member;
a base member fluid path formed in the annular partitioning wall, the base member fluid path causing the chamber in the first side and the chamber in the second side to communicate with each other;
two or more bypass paths that bypass the base member fluid path, the two or more bypass paths causing the chamber in the first side and the chamber in the second side to communicate with each other; and
valves provided in the base member fluid path and each of the two or more bypass paths;
wherein the two or more bypass paths have:
a one-side opening formed in a portion where the shaft member is disposed inside the chamber in the first side and opened to the chamber in the first side;
an other-side opening formed in a portion where the shaft member is disposed inside the chamber in the second side and opened to the chamber in the second side;
a one-side shaft member fluid path that is connected to the one-side opening and passes through an inner side of the shaft member;
an other-side shaft member fluid path that is connected to the other-side opening and passes through the inner side of the shaft member; and
a support member fluid path formed inside the support member to connect the one-side shaft member fluid path and the other-side shaft member fluid path;
wherein the one-side opening, the other-side opening, the one-side shaft member fluid path, and the other-side shaft member fluid path are shared by each of the two or more bypass paths; and
wherein valves of the valves, which are provided in the two or more bypass paths, are housed in the support member.

2. The shock absorber according to claim 1, wherein:
the shaft member has a dual tube structure including an outer tube and an inner tube;
the one-side shaft member fluid path is formed between the outer tube and the inner tube; and
the other-side shaft member fluid path is formed inside the inner tube.

3. A shock absorber comprising:
a chamber disposed in a first side and a chamber disposed in a second side that each contain a working fluid;
a shaft member inserted from the chamber in the first side through the chamber in the second side;
an annular partitioning wall held in an outer circumference of the shaft member to partition the chamber in the first side and the chamber in the second side;
a support member connected to a base end of the shaft member to support the shaft member;
one or more fluid paths that cause the chamber in the first side and the chamber in the second side to communicate with each other;
one or more valves provided in each fluid path; and
a shock absorber main body having an outer tube and an inner tube retractably inserted into the outer tube;
wherein at least one of the one or more fluid paths is a bypass path having:
a one-side opening formed in a portion where the shaft member is disposed inside the chamber in the first side and opened to the chamber in the first side;
an other-side opening formed in a portion where the shaft member is disposed inside the chamber in the second side and opened to the chamber in the second side;
a one-side shaft member fluid path that is connected to the one-side opening and passes through an inner side of the shaft member;
an other-side shaft member fluid path that is connected to the other-side opening and passes through the inner side of the shaft member; and
a support member fluid path formed inside the support member to connect the one-side shaft member fluid path and the other-side shaft member fluid path; and
wherein the one or more valves provided in the bypass path are housed in the support member;
wherein the chamber in the first side and the chamber in the second side are formed inside the shock absorber main body; and
wherein the support member is a cap member that stops a chassis-side opening of the shock absorber main body.

4. The shock absorber according to claim 3, wherein:
the bypass path comprises two or more bypass paths; and
the one-side opening, the other-side opening, the one-side shaft member fluid path, and the other-side shaft member fluid path are shared by each of the bypass paths.

5. The shock absorber according to claim 4, wherein:
the shaft member has a dual tube structure including an outer tube and an inner tube;
the one-side shaft member fluid path is formed between the outer tube and the inner tube; and the other-side shaft member fluid path is formed inside the inner tube.

\* \* \* \* \*